United States Patent [19]
Eklund

[11] 3,823,951
[45] July 16, 1974

[54] UNBONDED FLEXURE SEAL DESIGN

[75] Inventor: Phillip R. Eklund, Dayton, Ohio

[73] Assignee: The United States of America as represented by the Secretary of the United States Air Force, Washington, D.C.

[22] Filed: Sept. 7, 1972

[21] Appl. No.: 287,188

[52] U.S. Cl.................................. 277/208, 277/225
[51] Int. Cl............................................. F16j 15/32
[58] Field of Search ............ 277/206, 208, 205, 212

[56] References Cited
UNITED STATES PATENTS
2,606,086  8/1952  Rappl................................ 277/208
2,889,183  6/1959  Reras................................. 277/206

FOREIGN PATENTS OR APPLICATIONS
610,269  12/1960  Canada.............................. 277/208

Primary Examiner—Samuel B. Rothberg
Assistant Examiner—Robert I. Smith
Attorney, Agent, or Firm—Harry A. Herbert, Jr.; Arthur R. Parker

[57] ABSTRACT

A cryogenic compressor-displacer piston seal device consisting of an unbonded slip-on type flexure bushing member incorporating an inner lip in an interference fit and forming a small gas chamber with the piston, and a pair of outer lips in a line and slidable fit with the piston cylinder wall. Gas pressure directed into the small gas chamber deforms or flexes the flexure bushing seal member in an outward direction to force the outer lips thereof into a gas-tight relation with the cylinder wall. Radial expansion of the piston is automatically absorbed, and therefore compensated for by the inherent ability of the bushing member to simultaneously flex or deform therewith.

3 Claims, 12 Drawing Figures

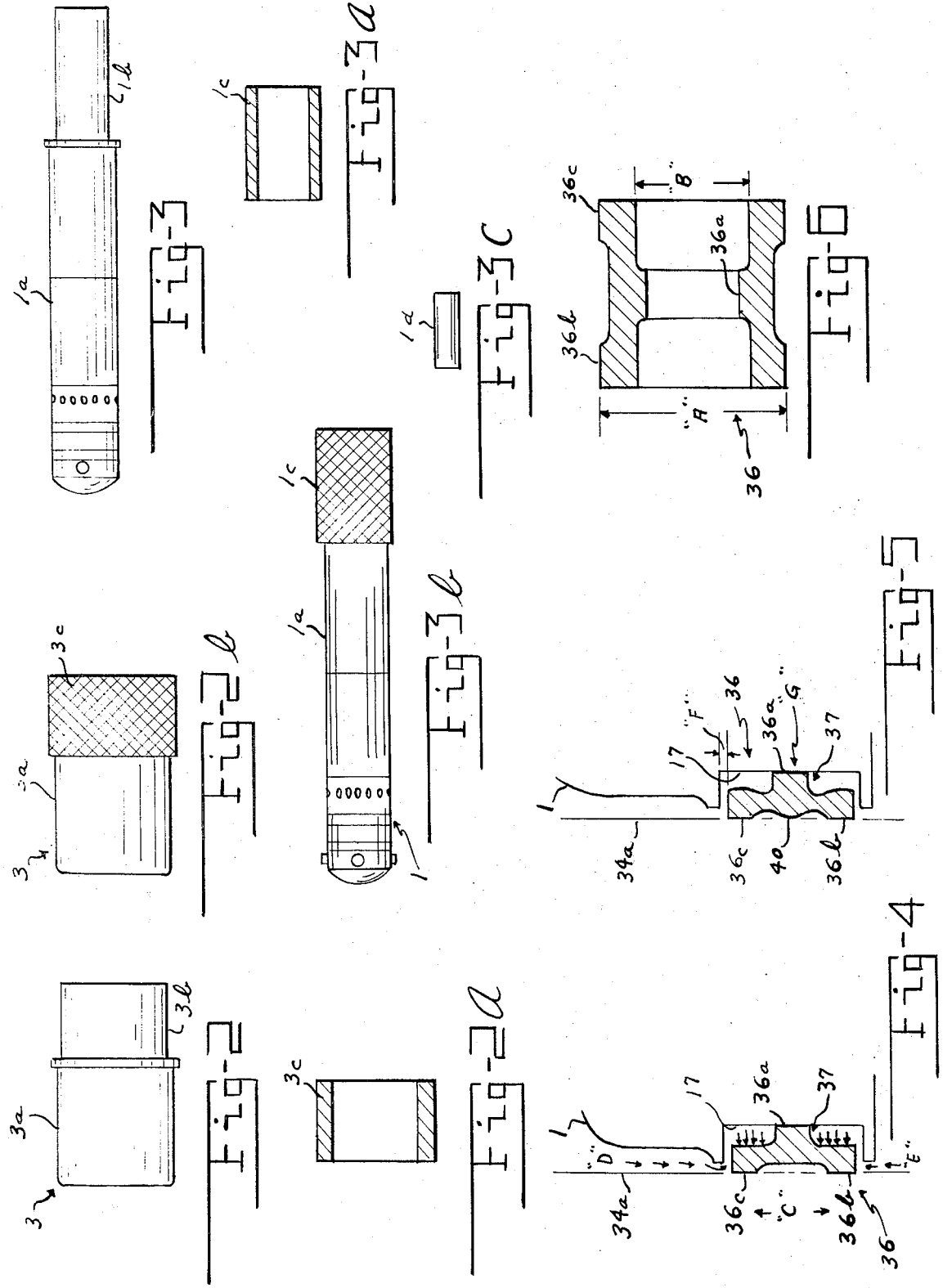

UNBONDED FLEXURE SEAL DESIGN

BACKGROUND OF THE INVENTION

This invention relates to an improved displacer piston seal device that is utilizable in a cryogenic compressor previously described by the present applicant in a patent application, Ser. No. 764,813, filed on Oct. 3, 1968, and later issued as U.S. Pat. No. 3,515,034 on June 2, 1970.

In the aforementioned U.S. Pat. No. 3,515,034, a cryogenic compressor is disclosed that incorporates both first and second stage displacer pistons that are sealed within their respective cylinders by means of a thin Rulon A (Teflon) bushing of approximately 0.005 inches in thickness and which is held in position on the appropriate surfaces of each piston by an adhesive (epoxy) bond. Since these pistons are actually fitted in their cylinders with a nominal clearance of only 0.001 inch, there is naturally some wear-and-tear normally occurring on the Rulon A seal and its bond during compressor operation. Of course, this severely limits the wear life and thus usefulness of the Rulon A seal. Moreover, although it is obviously very desirable that the maximum amount of gas (in this instance, helium) be passed through the compressor units, even with only a 0.001 inch clearance some gas leakage results between the seal and cylinder wall. In addition, an excessive, or above normal amount of heating of the piston assembly, due to improper or insufficient cooling, causes the radial expansion of the piston, which expansion can effect the engagement and binding of the Rulon A seal against the cylinder wall. Further heating and destruction of the seal and its epoxy bond with the surface of the piston, as well as damage to the displacer piston rod and other compressor units can and does result.

In investigating techniques for improving the wearability and therefore the life of the displacer piston seal, the new and improved techniques of the present invention were developed. These techniques, to be disclosed hereinafter in the following summary and detailed description, involves unique means both for improving the wearability of the displacer piston seal, and to provide a more positive gas-tight relation between the piston and its appropriate cylinder wall, as well as to incorporate novel means automatically compensating for the thermal expansion of the piston.

SUMMARY OF THE INVENTION

This invention consists briefly and primarily in the use of a unique slip-on type of a flexure bushing seal member that has been specifically modified for use with the first and second stage displacer pistons of an existing miniature reciprocating cryogenic compressor, but which is naturally of more general utility in other compressor applications. It incorporates a single inner lip portion that is disposed in a relatively slight interference and sliding fit with the piston circumference, and a pair of outer lip portions disposed in a line-to-line and sliding fit with the inner circumference of the appropriate piston cylinder wall. It is because of the above-indicated unique combination of the aforementioned inner lip portion being in a slight interference fit with the piston and the pair of outer lip portions being in a line fit with the cylinder wall that the inventive bushing seal member has a positive and definite built-in flexure characteristic that constitutes the key feature thereof and the function(s) of which will be further described.

The aforementioned bushing seal member, except for the inner lip portion thereof, is actually positioned relative to the respective displacer piston circumference so that a relatively small gas chamber, communicating with the gas being displaced during compressor operation, is specifically formed behind the seal member and between the seal member and the piston. With this novel relationship, gas pressure building up during compressor operation is specifically directed into this small gas chamber and acts radially outwardly against the back of the inventive bushing seal member and, due to the inherently flexure or flexible nature thereof, causes the outer lip portions to flex, deform and thus move into a positive, gas-tight gripping or sealing relation against the piston cylinder wall with a force in direct proportion to the gas pressure. Naturally, on a decrease of this gas pressure, the seal pressure is also correspondingly reduced.

In addition to providing for and ensuring the positive leakproof seal with cylinder wall through the action of the gas pressure therebehind, the novel built-in flexure nature or characteristic of the inventive bushing seal member also automatically absorbs or compensates for any radial expansion of the displacer piston, because of the excessive heating thereof, simply by simultaneously being able to expand with the said piston, as will be further described and illustrated in more detail hereinafter. In this connection, the sealing capacity of the bushing seal member of the present invention is unaffected by such radial expansion for the reason that relatively little radial expansion is generated therein from the thermal expansion of the piston.

Since it is highly desirable that no oil or grease-type of lubrication be used in conjunction with the present seal and, of course, in view of the fact that the outer lip portions of the inventive bushing seal member must, of course, be able to slide or move rather easily relative to the piston cylinder wall with which they are in sealing contact, a material must be used therefor that eliminates the need for such conventional lubrications. Thus, for the unbonded bushing seal member of the preferred form of the present invention, a composition is used that is known as "Isolon" and which consists of 55 percent by weight of bronze powder of an approximate size of 325 mesh, and 5 percent by weight of molybdenum disulphide ($MoS_2$) has shown excellant results. Also, a polyimide material known as DuPont "Vespel" SP-3 has proven satisfactory and, in addition, one or more of the so-called sintered porous bronze types of a composite that has been impregnated with Teflon offers satisfactory friction and wear characteristics depending, of course, on test results of the particular composite in question.

Inherent objects and advantages of the present invention will become readily apparent from the following disclosure thereof, taken in connection with the accompanying drawings, in which:

BRIEF DESCRIPTION OF THE DRAWINGS

FIGS. 2, 2a and 2b, and 3, 3a, 3b and 3c are relatively enlarged and detailed views respectively showing the various components and assemblies of the first and second stage displacer pistons that are applicable to the compressor of FIG. 1;

FIGS. 4 and 5 are schematic, and partly broken-away and sectional views respectively depicting details of the disposition and dual operation of the improved flexure seal device of the present invention both to seal against the cylinder wall and to automatically compensate for radial expansion of the piston;

FIG. 6 is a relatively enlarged expansion view, more clearly showing details of the inventive unbonded flexure seal device.

DESCRIPTION OF THE PREFERRED EMBODIMENT

Figures 1, 7:
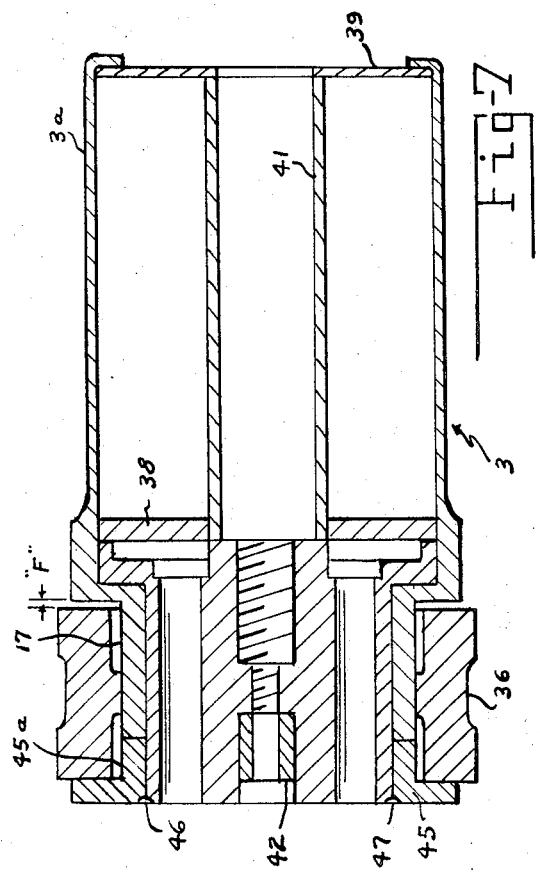
FIG. 1 is an overall longitudinal sectional view, partly schematic and broken-away, of a prior art cryogenic compressor to which the improved displacer piston seal of the present invention is applicable.
FIG. 7 is a longitudinal sectional view particularly showing further details of the mounting of the inventive unbonded flexure seal device of FIG. 6 to the cryogenic compressor-first and/or second stage displacer piston.

Referring generally to the drawings and, in particular, to FIG. 1, the prior art cryogenic compressor previously described in applicant's U.S. Pat. No. 3,515,034 is illustrated generally at 30 as comprising a compression cylinder 31, a heat exchanger 32 bolted, or otherwise joined to the compression cylinder 31, a vacuum chamber housing 33 interconnected with the heat exhanger 32 and incorporating a vacuum chamber 33a, and a combined first and second stage displacer piston housing at 34 with a "cold finger" at 35. The combined first and second stage displacer piston housing 34 includes a relatively narrow and elongated upper piston housing portion or cylinder 34a and a relatively enlarged and shortened, lower piston housing portion or cylinder 34b that is integrally joined at 34c to a reduced diameter portion 33b of the vacuum chamber housing 33. With the said reduced diameter portion 33b, the remaining portion of the vacuum chamber housing 33 forms, with the second stage displacer piston cylinder 34b, a relatively reduced size chamber portion extending to the position where the combined first and second stage displacer piston housing 34 is reduced in diameter at the juncture between the first and second stage displacer piston-cylinders 34a and 34b, from which the previously-noted vacuum chamber 33a extends with a greatly increased diameter to its uppermost extend (or, in other words, to the left as viewed in FIG. 1).

The aforementioned combined first and second stage displacer piston housing 34 encloses the first and second stage displacer pistons 3 and 1. As previously described, in the cryogenic compressor 30 of the aforementioned FIG. 1, the first and second stage displacer pistons 3 and 1 are fitted within their respective piston housings or, in other words, cylinders 34a and 34b with a nominal clearance of just 0.001 inch and are each further sealed to their corresponding cylinder wall by the previously noted Rulon A (Teflon) seal which is only on the order of 0.005 of an inch in thickness and is therefore obviously of a relatively reduced wearability. Moreover, it is adhered to the piston surface by an epoxy adhesive material that proved to be of a relatively low stength and reduced wearability, and thus of a relatively short life when used under the normal operating conditions of the previously described prior art cryogenic compressor 30 (FIG. 1), when compared with an improved sealing means to be described hereinafter. In this connection, and in accordance with the unique teachings of the present invention, the aforesaid Rulon A Teflon seal may be replaced with one or the other of two alternate techniques, each of which have proven to be superior thereto in resisting the wear-and-tear inherent under the normal or exceptional operating conditions of the cryogenic compressor of FIG. 1.

Again referring to the previously-noted FIG. 1, the displacer pistons 1 and 3 are shown interconnected by the displacer piston-tie rods 2 and 4, the latter element being slidably supported in correct position within the compressor 30 by a heat exchanger bushing 5 and the piston head bushing 6, which is retained in position by a snap ring 7 and sealed by an O-ring 8 to the compression piston assembly 9. The compressor 30 incorporates certain operating mechanism and supporting elements therefor which includes a motor, indicated schematically and in broken-away form at 43, a motor rotor drive shaft 44, a rotor shaft bearing 25, a counterweight 24, a connecting rod bearing and connecting rod, indicated respectively at 21 and 22, with the snap ring 23, and the connecting rod crankpin at 19, with the snap ring 20. Additional drive and driven mechanism with support therefor further includes the displacer rod crankpin bushing 18 and displacer rod drive link 16, the crosshead slide, slider bushing and bushing, indicated respectively at 13, 14 and 15, the displacer rod bushing 12, wrist pin 11 and wrist pin bushing 10. The driven means for the displacer tie rod 4 still further includes the displacer rod crosshead 27 that is retained adjacent the end portion of the rod 4 by an elastic stop nut 26. Thus, actuation of the motor 43 results in operation of the previously-described, first and second stage displacer pistons 3 and 1 through means of their interconnecting tie rods 4 and 2.

To provide a much more reliable and longer wearing, and therefore more efficient seal between the displacer pistons 1 and 3 and their respective cylinders 34b and 34a, the present applicant initially provided for the removal of the prior art Rulon A (Teflon) seal and its replacement with the improved arrangement illustrated in FIGS. 2, 2a and 2b, and 3, 3a, 3b and 3c, respectively, for the first and second stage displacer pistons 3 and 1. First of all, however, the Rulon A seal and its epoxy bond were removed from each by placing the aforesaid displacer pistons in a perchlorethylene type of ultrasonic cleaner solution for a short cleaning period of approximately 15–20 minutes and thereafter leaving the piston in the solution for more than 1 ½ hours. At this time, the epoxy bond had dissolved and the Rulon A seal was readily peeled off.

After removing the Rulon A (Teflon) seal, as indicated hereinabove, each displacer piston is then uniquely modified as seen in the aforementioned FIGS. 2, 2a and 2b, for example, for the relatively short first stage displacer piston 3, to incorporate a Teflon composite bushing 3c (FIG. 2a) that is of a substantially increased thickness and therefore of greater wearability than the Rulon A (Teflon) seal, and which is to be assembled on the reduced diameter portion 3b (FIG. 2) of the main displacer piston portion 3a. Before such assembly, however, a thin coating of a relatively hard bond type of an epoxy adhesive material, known as the A-12 epoxy bond and available from Techkits of Demarest, New Jersey, is spread on each appropriate surface including the piston-reduced diameter portion 3b and the Teflon composite bushing 3c. Next, these two elements are assembled to each other, as is depicted in FIG. 2b, the assembly is baked at 150°F. for 1 hour and then machine finished to the desired dimensions. It is noted that the aforementioned A-12 epoxy bond results from the mixture of an aromatic epoxy resin with a catalyst of aliphatic polyamine, with the reaction therebetween producing the A-12 epoxy bond. The relatively elongated second stage displacer piston 1, that is comprised of various components and an assembly respectively illustrated in FIGS. 3, 3a, 3b and 3c, is similarly modified and, as such, incorporates a main piston portion 1a (FIG. 3) having a reduced diameter portion 1b on one end thereof, a bushing member at 1c (FIG. 3a) that is assembled on the said reduced diameter portion 1b, and a plurality of guide pins, one of which being denoted at 1d in FIG. 3c, formed on the opposite end of the piston portion 1a. The complete assembly thereof is indicated in FIG. 3b. Of course, as in the case of the first stage displacer piston 3, the bushing member 1c (FIG. 3a) is of a considerably greater thickness and more wearable than is the Rulon A seal and it is preferably constructed of a more resistent material such as DuPont SP-3 "Vespel" polyimide material that has proven resistant to considerably higher temperatures of the order of 600°F., as compared with generally the temperature of 350°F. to which the Teflon material of the Rulon A seal is generally successfully resistant. This material, as in the case of its counterpart in the first stage displacer piston 3, is naturally substantially frictionless and thus provides an extremely smooth sliding relation with the cylinder wall.

The aforementioned guide pins, as at 1d in FIG. 3c, are required and were also included in the prior art cryogenic compressor 30 (FIG. 1) in order to support and guide one end of the second stage displacer piston 1 within its cylinder due to the relatively elongated configuration thereof. In the aforesaid cryogenic compressor 30, these guide pins actually consisted of a series of evenly spaced Rulon A pads. In the form of the invention of FIGS. 3, 3a, 3b and 3c, these Rulon A pads have been drilled out with a 1/16 inch drill and four openings redrilled thereat with a No. 38 (0.101 inch) diameter drill to a depth of 5/32 of an inch. Each of the four openings so formed receive one end of a guide pin, as at 1d in FIG. 3c, which guide pins have also been previously coated with a thin coating of the previously discussed A-12 epoxy bond. These guide pins may also be comprised of the aforementioned DuPont "Vespel" polyimide material. Thus, the modifications discussed above for the inventive form of the first and second stage displacer positions 3 and 1, as described in specific connections with FIGS. 2, 2a and 2b, and 3, 3a, 3b and 3c, represents a significant improvement over the Rulon A seal. In fact, the aforesaid modified displacer pistons 1 and 3 have been exposed, for test purposes, to the same ultrasonic cleaning procedure for a total times of over 3 hours with no deleterious effect and, in addition, have operated with successful sealing in the cryogenic compressor 30 for several hundred hours.

Although the foregoing modification of the displacer pistons 1 and 3 to utilize the Teflon composite and/or polyimide bushing that is epoxy bonded with a superior epoxy adhesive; namely, the A-12 epoxy bond, offers a significant improvement to the operation of the cryogenic compressor 30 by providing a displacer piston seal of greater wearability and resistance to above normal operating temperatures; nevertheless, the present inventor provides a further and very substantial additional improvement in the development of an unbonded, slip-on type of seal unit to be applied to the first and second stage displacer pistons 3 and 1, and, moreover, actually constituting the principal and preferred form of the invention. In this regard, and with particular reference to the component view of FIG. 6, it is clearly seen that this alternate form of the invention consists of a hollow, slip-on type of flexure bushing seal member, indicated generally at 36 in FIG. 6, for example, which seal member 36, in the form thereof used with the relatively short, first stage displacer piston 3 (FIG. 1), may have an overall outside diameter (O.D.), as denoted at A, of approximately 0.788 inches, and a principal or overall inside diameter (I.D.), as depicted at B, of about 0.734 inches. In the form of the flexure seal member 36 used with the relatively elongated, second stage displacer piston 1, the outside diameter A and inside diameter B thereof may be approximately and respectively 0.4720 and 0.428 inches.

The above-noted, unbonded flexure bushing seal member 36 incorporates a single lip portion, at 36a, which may extend further inwardly from the inside diameter B a distance of approximately either 0.004 inches or 0.008 inches respectively for the first and second stage displacer pistons 3 and 1 to thereby uniquely ensure that the said inner lip portion 36a is in only a slight interference fit relation with the appropriate displacer piston, as at 1 and which is clearly visible in the schematic view of FIG. 4, for example. In novel combination with the inner lip portion 36a, the inventive flexure bushing seal member 36 also incorporates an identical pair of spaced-apart, outer lip portions at 36b, and 36c (Note FIGS. 4 and 6, for example), which outer lip portions 36b, 36c have been specifically designed into a line-to-line fit (Note FIG. 4) relation with the inside surface or circumference of the wall of the corresponding piston cylinder, as at 34a in the aforementioned FIG. 4. A similar bushing seal member arrangement is, of course, provided for the first stage displacer piston 3. It is because of this new and improved incorporation of the unique combination of the single inner lip portion 36a in a slight interference fit with the displacer piston, and the outer lip portions 36b and 36c in the previously described line fit with the cylinder wall that the present bushing seal member 36 has a positive and definitely controlled and/or controllable, inherent flexure characteristic that performs a two-fold function to be described hereinafter. Note also that the said outer lip portions 36b and 36c are respectively disposed on opposite sides of a center line through the inner lip portion 36a and, in this manner, definitely provides the built-in flexure capability of the seal member 36. Moreover, the said flexure bushing member 36 is, as has been previously inferred, a slip-on type of element that requires no epoxy bond for its retention on the appropriate displacer piston 1 or 3. Other means are used for this purpose, as will be subsequently explained.

Again referring to FIG. 4, it is clearly illustrated that the inventive bushing seal member 36 is primarily mounted within a circumferential recess 17 specifically provided therefor and designed in an appropriate portion of the outer circumference of each displacer piston, as for example the second state displacer piston 1. The said bushing seal member 36 is so positioned in the recess 17, because of the projecting inner lip portion 36a thereof being in the previously described slight interference fit, that a relatively small gas-receiving space or chamber 37 is formed generally behind the bushing seal member 36, and, in particular, around the inner lip portion 36a and directly in back of both outer lip portions 36b and 36c. Thus, during compression involving the back and forth movement of the displacer piston, as at 1, as indicated by the double arrow C, and the alternate flow of gas into the chamber 37 in the opposite directions, indicated respectively at D and E, the gas pressure building up in the said chamber 37 will cause the outer lip portions 36b and 36c to flex, deform and/or move radially outwardly to thereby contact and seal in a gas-tight relation in the aforementioned line-to-line fit against the cylinder wall, as at 34a. Of course, the overall axial length encompassed by the outer lip portions 36b and 36c is made slightly less than that of the recess 17 to thereby specifically provide a slight clearance, as has been specifically indicated at F in FIG. 5, for ensuring the previously-described alternate flow of gas into the chamber 37, as well as to allow for any longitudinal expansion of the member 36. This sealing action of the outer lip portions 36b and 36c against the cylinder wall constitutes one principal function of the flexure bushing seal member 36.

With specific reference to FIG. 5, a second principal function of the inventive bushing seal member 36 comes into operation during the radial expansion, indicated in the direction of the arrow G, or growth of the displacer piston, as at 1. This radial expansion or growth is uniquely absorbed and therefore automatically compensated for by the inherent capability of the bushing seal member 36, due to the contact of the inner lip portion 36a thereof with the piston, to flex in a radially outward direction, as is generally indicated by the curvature thereof at 40, or, in other words, to simply expand simultaneously with the expansion or growth of the displacer piston, as at 1. In this connection, in practice the sealing capacity of the bushing seal member 36 is not affected, since only a very small amount of radial pressure is generated from the expansion of the displacer piston.

Another improved feature of the present flexure bushing seal member 36 is that it is positioned on the displacer piston 1 and/or 3 with its inner lip portion 36a in the above-noted slight interference fit therewith and is retained thereon without any need for the epoxy bond of other seal forms, such as that used with the prior art Rulon A seal of FIG. 1. In this connection, FIG. 7, for example, illustrates more details of the first stage displacer piston 3, as it is being used in a current application thereof. The aforesaid FIG. 7, which is a relatively enlarged view, depicts the first stage displacer piston 3 as including a main piston portion, again indicated at 3a and which incorporates the previously noted recess 17 (FIGS. 4 and 5) within which the invention flexure bushing seal member 36 is shown mounted. A partially screw-threaded central passage, at 41, provides the means for mounting the piston 3 on the tie rod 4 (FIG. 1). A spacer element is incorporated at 42, and perforated base, and end plates are utilized respectively at 38 and 39 for supporting interior screens (not shown).

As stated hereinbefore, the flexure bushing seal member 36 is a slip-on type element that is simply positioned in its proper place merely by sliding or slipping it over the particular displacer piston, as at 3, and within the recess 17 provided therefor. To facilitate this slip-on action of the seal member 36, in the detailed form of the invention of FIG. 7, one side of the recess 17 is actually formed by an interiorly disposed, inwardly extending and circumferentially oriented abutment 45a formed on an end cap member 45. Thus, after the inventive flexure bushing seal member 36 is slipped over the end of the displacer piston 3, for example, within the recess 17, the aforesaid end cap member 45 is thereafter mounted in its correct position and rigidly attached to the appropriate end of the displacer piston by means of staking in a plurality of places, as is indicated generally at 46 and 47, for example. Similar means are also used to position the inventive flexure bushing seal member 36 on the second stage displacer piston 1. Again, it is noted that the overall axial length of the bushing seal member 36 is made a little less than that of the recess 17, as noted hereinbefore, to create a slight clearance, as seen at F in the aforementioned FIG. 7, to allow both for the flow of gas thereinto during the displacement of each displacer piston, as at 3, and to additionally provide a space for the longitudinal expansion of the seal member 36.

Thus, a new and improved cryogenic compressor-displacer piston seal has been developed by the present invention wherein an unbonded, slip-on type of bushing member incorporates a built-in flexure ability that uniquely automatically compensates for radial expansion or growth of the piston, and utilizes the build-up of gas pressure developed during compression and acting rearwardly against the seal in a radially outward direction to deflect the seal into a gas-tight relation with the cylinder wall.

I claim:

1. A gas-tight seal for a displacer piston having a seal-receiving recess disposed in and completely around a portion of the periphery thereof, and being delineated in width by a pair of abutments extending in a radially outward direction toward the wall of the cylinder in which the piston is mounted; said seal comprising; a circumferentially disposed, slip-on and non-bonded liner mounted in said seal-receiving recess and disposed and thereby confined in a first, longitudinal direction between but not contacting said abutments, and in a second, radial direction between the piston and said cylinder; said liner incorporating an inner, piston-engaging portion comprising a first, relatively narrow, single resilient seal element having an end in resilient contact with the surface of said piston in said seal-receiving recess; and an outer, cylinder-engaging portion comprising a second, relatively wide, resilient seal element integrally formed in opposed relation to, and on an opposite end of said first, resilient element; said second, resilient seal element incorporating resilient and integral arm portions extending in opposite directions, and in transverse relation to said first, resilient seal element and normally disposed in close proximity to the inside wall of said cylinder; said oppositely extending arm portions each having an opposite end portion integrally mounting a cylinder wall-engaging resilient element, and further terminating at a position within and out of contact with said pair of abutments to thereby form a common, gas-receiving and automatic gas pressure-applying chamber surrounding said first-named resilient seal element and further disposed directly behind and between said second-named resilient seal element and the piston; the chamber still further being in limited communication with, and receiving a relatively small portion of, the main gas flow being alternately displaced during compression, and thereby to concentrate and positively direct the increasing pressure of gas being so produced in and by the limited extent of the chamber in a radially outward direction directly against both of the said oppositely extending arm portions of said second-named resilient seal element to thus move the cylinder wall-engaging resilient elements formed on each end thereof into a positive, gas leak-proof engagement with cylinder wall.

2. In a gas-tight seal as in claim 1, wherein said liner comprises an unbonded, slip-on bushing member; and said first, single resilient seal element comprises an inner, flexible lip portion interiorly formed on the inside surface of said bushing member and disposed in a relatively slight interference fit with, and thereby automatically flexing outwardly and absorbing any radial expansion being imparted to the piston.

3. In a gas-tight seal as in claim 2, wherein the cylinder wall-engaging resilient elements formed on each end of the oppositely-extending arm portions of said second, resilient seal element each comprise a flexible outer lip portion disposed in a slidable and line-to-line fit against the cylinder wall to thereby provide, in conjunction with the relatively slight interference fitting relation of said inner lip portion to said piston, a positive and definitely controlled, built-in flexure characteristic to the said seal.

* * * * *